(12) United States Patent
Takagawa et al.

(10) Patent No.: US 8,209,980 B2
(45) Date of Patent: Jul. 3, 2012

(54) CYLINDER HEAD OF INTERNAL-COMBUSTION ENGINE

(75) Inventors: Hajime Takagawa, Susono (JP); Naomi Tosa, Mishima (JP); Tetsuo Oshita, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 394 days.

(21) Appl. No.: 12/449,223

(22) PCT Filed: Feb. 7, 2008

(86) PCT No.: PCT/JP2008/052065
§ 371 (c)(1),
(2), (4) Date: Jul. 29, 2009

(87) PCT Pub. No.: WO2008/099758
PCT Pub. Date: Aug. 21, 2008

(65) Prior Publication Data
US 2010/0095671 A1    Apr. 22, 2010

(30) Foreign Application Priority Data
Feb. 7, 2007  (JP) ................................. 2007-028236

(51) Int. Cl.
*F02D 23/00* (2006.01)
*F01N 5/04* (2006.01)
*F01N 3/00* (2006.01)
*F02F 1/42* (2006.01)

(52) U.S. Cl. ............ 60/602; 60/280; 60/288; 123/193.5
(58) Field of Classification Search .................... 60/602, 60/280, 288; 123/193.5
See application file for complete search history.

(56) References Cited

U.S. PATENT DOCUMENTS

| 3,817,227 | A | * | 6/1974 | Onishi | 123/73 A |
| 4,813,232 | A | * | 3/1989 | Hitomi et al. | 60/313 |
| 5,020,319 | A | * | 6/1991 | Matsuura et al. | 60/321 |
| 5,463,867 | A | * | 11/1995 | Ruetz | 60/602 |
| 8,141,357 | B2 | * | 3/2012 | Yamagata et al. | 60/602 |
| 2002/0026909 | A1 | | 3/2002 | Akiwa et al. | |

(Continued)

FOREIGN PATENT DOCUMENTS
CN    1376853 A    10/2002
(Continued)

OTHER PUBLICATIONS

Office Action for corresponding Chinese Patent Application No. 200880003689.6, mailed on Apr. 26, 2011 (w/ English translation).

(Continued)

*Primary Examiner* — Thomas Denion
*Assistant Examiner* — Cameron Setayesh
(74) *Attorney, Agent, or Firm* — Oliff & Berridge, PLC

(57) ABSTRACT

One ends of an exhaust path communicate with a plurality of combustion chambers through exhaust ports, respectively, an assembling section is provided on the other ends of the exhaust path, and a turbo supercharger, an exhaust tube and an exhaust purification catalyst are connected to the assembling section, on the other hand, a bypass path communicating from the exhaust path to the exhaust tube and the exhaust purification catalyst by bypassing a turbo supercharger is provided and an exhaust control valve capable of opening and closing the bypass path is provided, and a bypass hole, which is a part of the bypass path, is provided in the cylinder head.

3 Claims, 7 Drawing Sheets

U.S. PATENT DOCUMENTS

| | | | |
|---|---|---|---|
| 2002/0083700 A1* | 7/2002 | Ellmer et al. | 60/278 |
| 2002/0134072 A1 | 9/2002 | Fujieda et al. | |
| 2002/0134081 A1* | 9/2002 | Shiraishi et al. | 60/602 |
| 2005/0268600 A1 | 12/2005 | I et al. | |
| 2010/0192882 A1* | 8/2010 | Kaneko | 123/90.15 |

FOREIGN PATENT DOCUMENTS

| | | |
|---|---|---|
| CN | 1721664 A | 1/2006 |
| JP | A-49-54719 | 5/1974 |
| JP | A-63-314320 | 12/1988 |
| JP | A-1-182560 | 7/1989 |
| JP | A-2001-50038 | 2/2001 |
| JP | A-2002-19456 | 1/2002 |
| JP | A-2002-70551 | 3/2002 |
| JP | A-2002-276346 | 9/2002 |
| JP | A-2002-303145 | 10/2002 |
| JP | A-2003-227338 | 8/2003 |
| JP | A-2005-36726 | 2/2005 |
| JP | A-2005-188351 | 7/2005 |
| JP | A-2006-63851 | 3/2006 |

OTHER PUBLICATIONS

Office Action for corresponding Japanese Patent Application No. 2007-028236, issued on Jan. 4, 2011 (w/ English translation).

* cited by examiner

CYLINDER HEAD OF INTERNAL-COMBUSTION ENGINE

TECHNICAL FIELD

The present invention relates to a cylinder head of an internal-combustion engine including a combustion chamber configured by being fastened to an upper portion of a cylinder block, in which an intake path and an exhaust path are provided to the combustion chamber.

BACKGROUND ART

In general, in the internal-combustion engine, the cylinder head is assembled to the upper portion of the cylinder block and is fastened by a plurality of fastening bolts, and a plurality of combustion chambers are arranged in a linear fashion. An intake port and an exhaust port are formed for each of the combustion chambers, respectively, so as to oppose to each other, in which an intake path communicates with each intake port, on the other hand, an exhaust path communicates with each exhaust port, and they may be opened and closed by an intake valve and an exhaust valve, respectively. Also, an injector for injecting fuel into each intake path or each combustion chamber is mounted, and an ignition plug for igniting mixed air in the combustion chamber is mounted. An intake tube is connected to each intake path through an intake manifold, on the other hand, an exhaust tube is connected to each exhaust path through an exhaust manifold.

Therefore, when opening the intake valve, air is inhaled from the intake path through the intake port to the combustion chamber, and the fuel is injected from the injector to the intake path or the combustion chamber, then in the combustion chamber, mixed air of air and fuel is compressed by rising of a piston and high-pressure mixed air is introduced into the ignition plug and is ignited to explode, so that driving force can be obtained, and when opening the exhaust valve, the exhaust gas after combustion is discharged through the exhaust port to the exhaust path.

As such an internal-combustion engine, there is one, which is made smaller by integrally providing an exhaust assembling section in the cylinder head, without fixing a separate exhaust manifold to the cylinder head. The conventional cylinder head with the exhaust assembling section integrally formed is configured such that the exhaust ports communicate with a plurality of combustion chambers, the exhaust ports are assembled to open on a side surface, the exhaust tube is connected to the assembling section, and a turbo supercharger is mounted on the exhaust tube.

Meanwhile, as the cylinder head of the above-described conventional internal-combustion engine, there is one disclosed in the following patent document 1, for example.
Patent Document 1: JP-A-01-182560

DISCLOSURE OF INVENTION

Problem to be Solved by the Invention

An exhaust purification catalyst is mounted together with the turbo supercharger on an exhaust system of the internal-combustion engine. At the time of a cold start of the internal-combustion engine, by delaying ignition timing to introduce high-temperature exhaust gas to the purification catalyst through the exhaust pipe, the exhaust purification catalyst is warmed up for quick activation. In the cylinder head of the above-described conventional internal-combustion engine, since the exhaust path formed therein is assembled at the assembling section and the exhaust tube is connected thereto, the warm-up of the exhaust purification catalyst can be promoted by reducing a cross-sectional area of the exhaust path to inhibit lowering of an exhaust gas temperature. However, in the internal-combustion engine in which the turbo supercharger is mounted on the exhaust system, the exhaust gas passes through the turbine of the turbo supercharger even at the time of the cold start, so that the heat of the exhaust gas is herein taken away and there is a problem that the catalyst warm-up performance is lowered.

The present invention is to solve such a problem, and an object thereof is to provide the cylinder head of the internal-combustion engine in which the catalyst warm-up performance is improved and the device is made compact-sized.

Means for Solving Problem

In order to solve the above problems, and to achieve the object, a cylinder head of an internal-combustion engine according to the present invention includes a plurality of combustion chambers; a plurality of intake paths communicating with each of the combustion chambers through intake ports, respectively; an exhaust path having one ends communicating with each of the combustion chambers through exhaust ports, respectively, and an assembling section at which the other ends are assembled; a supercharger connected to the assembling section of the exhaust path; an exhaust purification catalyst connected to the assembling section of the exhaust path; a bypass path communicating from the exhaust path to the exhaust purification catalyst by bypassing the supercharger; and a control valve capable of opening and closing the bypass path, wherein a part of the bypass path is provided in the cylinder head of the internal-combustion engine.

In the cylinder head of the internal-combustion engine according to the present invention, a bypass hole having one end communicating with the assembling section of the exhaust path and the other end opening on a side surface of the cylinder head is formed as the bypass path.

In the cylinder head of the internal-combustion engine according to the present invention, the other end of the bypass hole is formed so as to open on a side portion on which the assembling section of the exhaust path opens.

In the cylinder head of the internal-combustion engine according to the present invention, the control valve is provided so as to be capable of opening and closing the other end of the bypass hole.

In the cylinder head of the internal-combustion engine according to the present invention, the control valve is composed of a valve body capable of opening and closing the other end of the bypass hole, an actuator, and a link connecting the actuator and the valve body, as a unit, and the control valve unit is provided on the side surface of the cylinder head.

In the cylinder head of the internal-combustion engine according to the present invention, a turbine housing of the supercharger has a scroll section, and the scroll section communicates with the assembling section of the exhaust path by being fixed to the side surface of the cylinder head.

In the cylinder head of the internal-combustion engine according to the present invention, a turbine housing of the supercharger has an exhaust guiding section having one end opening to outside and a scroll section with which the other end of the exhaust guiding section communicates, and the exhaust guiding section is arranged in the assembling section of the exhaust path.

In the cylinder head of the internal-combustion engine according to the present invention, a cooling path is provided on the turbine housing of the supercharger, and the cooling path communicates with a water jacket provided in the cylinder head.

In the cylinder head of the internal-combustion engine according to the present invention, the cooling path is provided on an outer peripheral portion of the turbine housing, a cooling water inlet communicating with the water jacket is formed on an upper end of the turbine housing, and a cooling water outlet communicating with the water jacket is formed on a lower end of the turbine housing.

Effect of the Invention

According to the cylinder head of the internal-combustion engine of the present invention, one ends of the exhaust path communicate with a plurality of combustion chambers through the exhaust ports, respectively, the assembling section is provided on the other ends thereof, the supercharger and the exhaust purification catalyst are connected to the assembling section, the bypass path communicating from the exhaust path to the exhaust purification catalyst by bypassing the supercharger is provided, and the control valve capable of opening and closing the bypass path is provided, then a part of the bypass path is provided in the cylinder head, so that it is possible to inhibit the lowering of the exhaust gas temperature to improve the catalyst warm-up performance by reducing a path surface area from the combustion chamber to the exhaust purification catalyst, and there is an effect of making a device compact by simplifying tube arrangement for discharging the exhaust gas.

Figure 1:
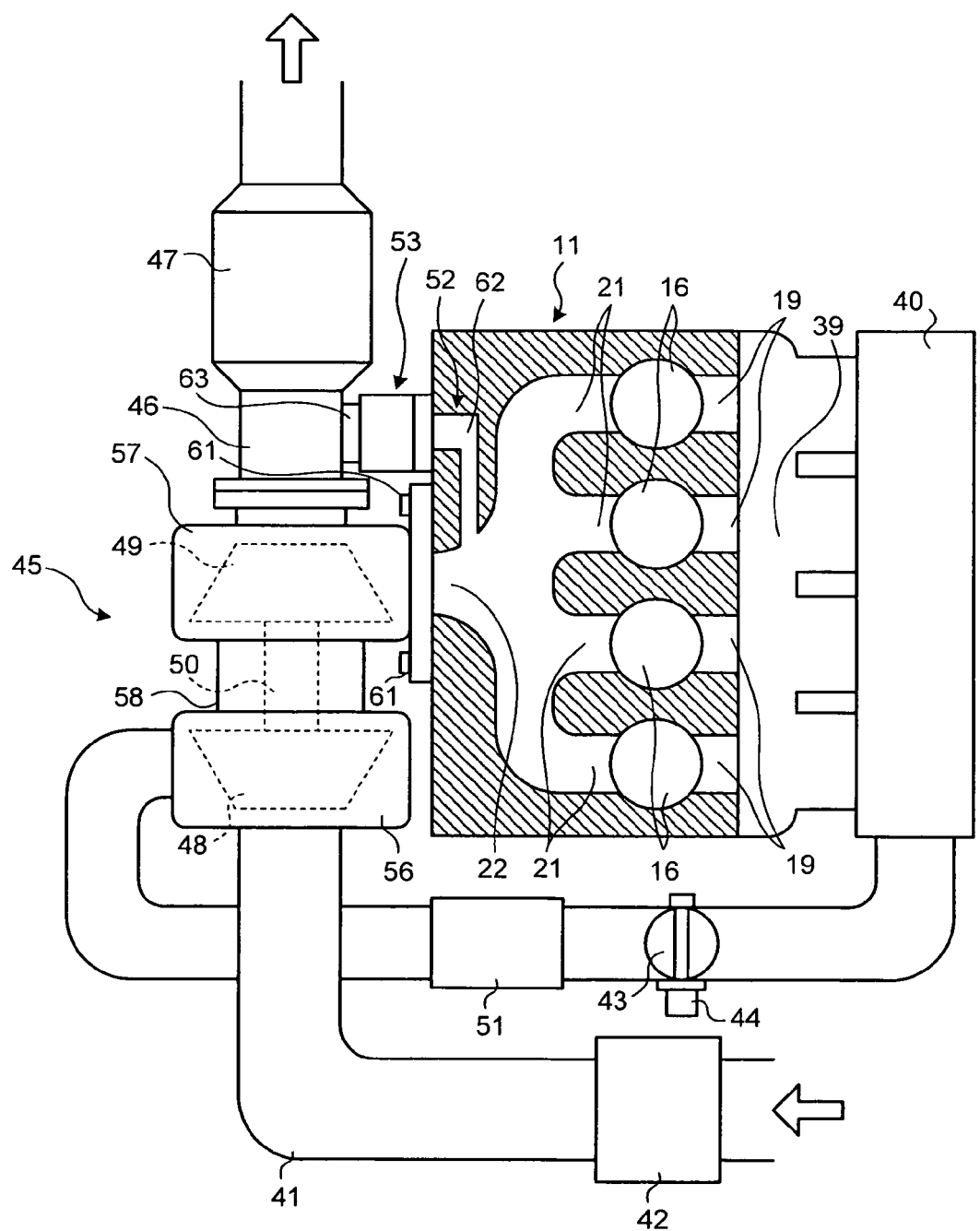
FIG. 1 is a schematic diagram illustrating a cylinder head of an internal-combustion engine according to a first embodiment of the present invention.

EXPLANATIONS OF LETTERS OR NUMERALS 11, 71, 81 cylinder head
12 cylinder block
14 piston
16, 82a, 82b, 82c, 82d combustion chamber
17, 83a, 83b, 83c, 83d intake port
18, 84a, 84b, 84c, 84d exhaust port
19, 85a, 85b, 85c, 85d intake path 20, 86 exhaust path
21, 87a, 87b, 87c, 87d exhaust path section
22, 88a, 88b assembling section
37 injector
38 ignition plug
41, 92 intake tube
45, 96 turbo supercharger (supercharger)
46, 97 exhaust tube
47, 98 exhaust purification catalyst
49, 102 turbine
52, 72 bypass path
53, 73 exhaust control valve (control valve)
54a, 54b, 55a, 55b water jacket
57, 104 turbine housing
59 scroll section
60 cooling path
62, 74 bypass hole
63, 75 bypass tube
107 connecting section
110, 111 exhaust guiding section

BEST MODE(S) FOR CARRYING OUT THE INVENTION

Hereinafter, embodiments of a cylinder head of an internal-combustion engine according to the present invention is described in detail with reference to drawings. Meanwhile, the present invention is not limited by the embodiments.

First Embodiment

Figure 2:
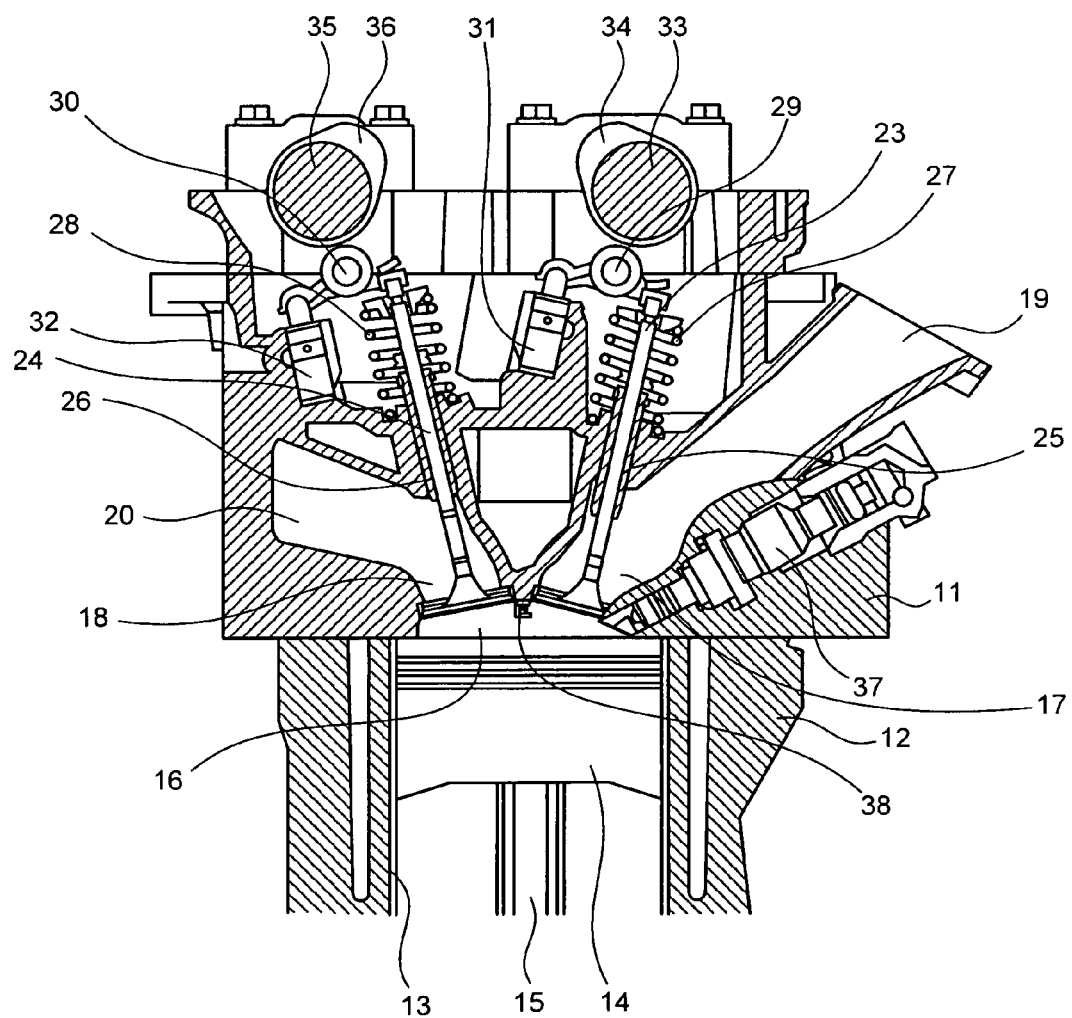
FIG. 2 is a vertical cross-sectional view illustrating the internal-combustion engine of the first embodiment.
Figure 3:
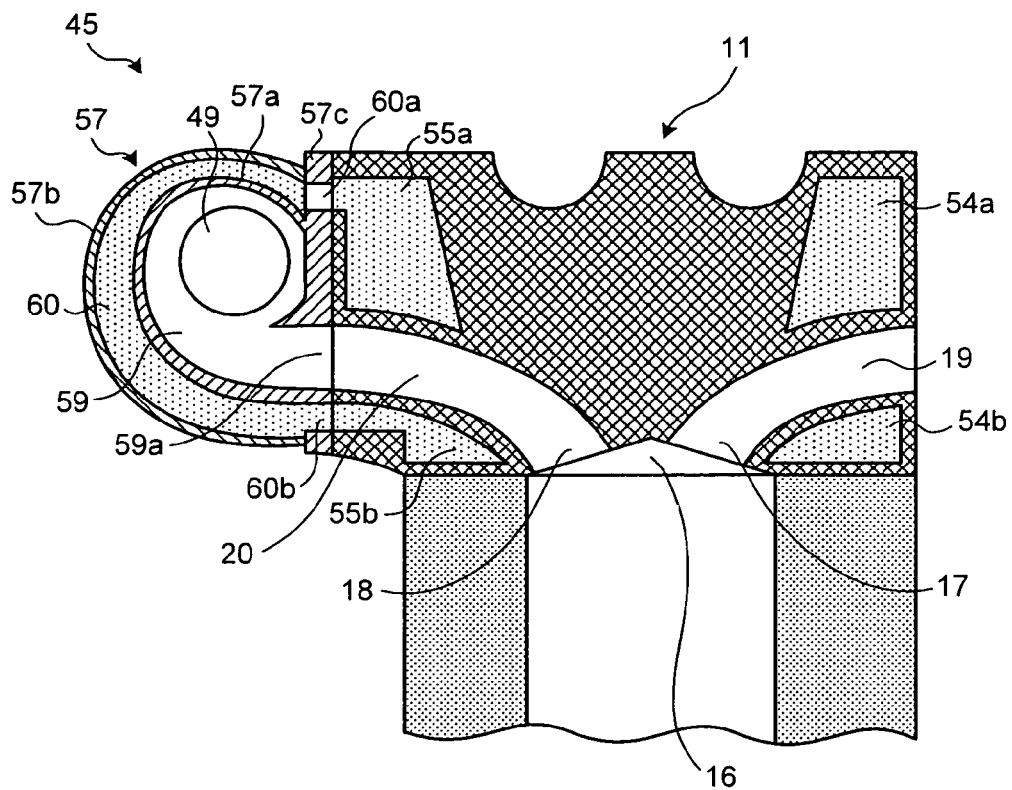
FIG. 3 is a vertical cross-sectional view illustrating the cylinder head of the internal-combustion engine of the first embodiment.
Figure 4:
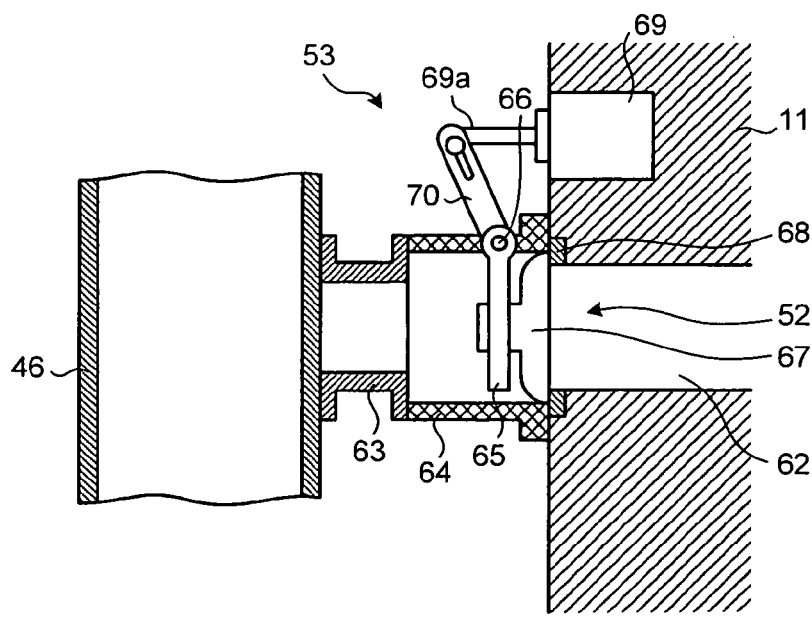
FIG. 4 is a cross-sectional view illustrating a waste gate valve in the internal combustion engine of the first embodiment.

FIG. 1 is a schematic diagram illustrating a cylinder head of an internal-combustion engine according to a first embodiment of the present invention, FIG. 2 is a vertical cross-sectional view illustrating the internal-combustion engine of the first embodiment, FIG. 3 is a vertical cross-sectional view illustrating the cylinder head of the internal-combustion engine of the first embodiment, and FIG. 4 is a cross-sectional view illustrating a waste gate valve in the internal-combustion engine of the first embodiment.

The internal-combustion engine of the first embodiment is an in-line four-cylinder engine, and as shown in FIGS. 1 and 2, a cylinder block 12 is assembled to a lower portion of a cylinder head 11 and fastened by a plurality of fastening bolts not shown. A plurality of (four, in the present embodiment) cylinder bores 13 are formed on the cylinder block 12 so as to be arranged in a linear fashion, and a piston 14 fits each cylinder bore 13 so as to be movable in an axial direction thereof. A crankshaft not shown is rotatably supported on a lower portion of the cylinder block 12, and each piston 14 is connected to the crankshaft through a connecting rod 15.

The cylinder head 11 has combustion chambers 16 formed thereon, one above each cylinder bore 13, respectively, so as to correspond thereto. The combustion chamber 16 is enclosed by an inner wall surface of the cylinder bore 13, a lower surface of the cylinder head 11 and a top surface of the piston 14, and is formed into a pent-roof shape in which a ceiling portion (the lower surface of the cylinder head 11) is inclined such that a central portion thereof is high. An intake port 17 and an exhaust port 18 are opened above each combustion chamber 16, that is to say, on the lower surface of the cylinder head 11, so as to be opposed to each other.

Also, on the cylinder head 11, four intake paths 19 each having one end communicating with each intake port 17 and the other end opening on one side surface thereof are formed. Also, on the cylinder head 11, one exhaust path 20 having one ends each communicating with each exhaust port 18, and other ends assembled and opening to the other side surface thereof is formed. The exhaust path 20 has four exhaust path sections 21 each communicating with each exhaust port 18 and an assembling section 22 at which the ends of the exhaust path sections 21 are assembled, in which each exhaust path section 21 communicates with the combustion chamber 16 through the exhaust port 18, and the assembling section 22 opens on the other side surface of the cylinder head 11.

An intake valve 23 and an exhaust valve 24 are positioned so as to correspond to each intake port 17 and each exhaust port 18, respectively. The intake valve 23 and the exhaust valve 24 are supported by stem guides 25 and 26 fixed to the cylinder head 11, respectively, so as to be movable in an axial direction, and are biasingly supported by valve springs 27 and 28, respectively, in a direction to close the intake port 17 and the exhaust port 18. Also, one ends of roller rocker arms 29 and 30 are connected to upper ends of the intake valve 23 and the exhaust valve 24, respectively, and the other ends of the roller rocker arms 29 and 30 are connected to lash adjusters 31 and 32 fixed to the cylinder head 11, respectively, and an intake cam 34 of an intake cam shaft 33 and an exhaust cam 36 of an exhaust cam shaft 35 contact the roller rocker arms 29 and 30, respectively.

Therefore, when the intake cam shaft 33 and the exhaust cam shaft 35 rotate in synchronization with the internal-combustion engine, the intake cam 34 and the exhaust cam 36 activate the roller rocker arms 29 and 30, respectively, and the intake valve 23 and the exhaust valve 24 move up and down at predetermined timing to open and close the intake port 17 and the exhaust port 18, respectively, thereby allowing the intake path 19 and the combustion chamber 16, and the combustion chamber 16 and the exhaust path section 21 of the exhaust path 20 to communicate with each other.

In addition, an injector 37 for directly injecting fuel into the combustion chamber 16 is mounted on a side portion of the combustion chamber 16, that is to say, on the lower surface of the cylinder head 11 on an intake path 19 side. Also, an ignition plug 38 is mounted on the central portion of the ceiling portion of the combustion chamber 16, that is to say, on the lower surface of the cylinder head 11 between the intake path 19 and the exhaust path section 21. An electronic control unit (ECU) is mounted on a vehicle, and the ECU can control fuel injection timing of the injector 37 and ignition timing by the ignition plug 38 and determines a fuel injection amount, the injection timing, the ignition timing or the like based on an engine operating state such as detected intake air quantity, throttle opening (accelerator opening) and an engine rotational number.

An intake manifold 39 communicating with each intake path 19 is fixed to one side surface of the cylinder head 11, and a surge tank 40 is connected to the intake manifold 39. An intake tube 41 has an air cleaner 42 attached to an air inlet on an upstream side thereof and a downstream side end connected to the surge tank 40, and is provided with an electronic throttle device 44 having a throttle valve 43 located on a downstream side of the air cleaner 42.

On the other hand, a turbo supercharger 45 communicating with the assembling section 22 of the exhaust path 20 is fixed to the other side surface of the cylinder head 11, an exhaust tube 46 is connected to the turbo supercharger 45, and an exhaust purification catalyst (three-way catalyst) 47 is mounted on the exhaust tube 46. The turbo supercharger 45 is composed of a compressor 48 provided on an intake tube 41 side and a turbine 49 provided on an exhaust tube 46 side integrally connected to each other by a connecting shaft 50. An intercooler 51 for cooling intake air of which temperature is increased by compression by the compressor 48 is provided on the intake tube 41 on a downstream side of the compressor 48 in the turbo supercharger 45 and on an upstream side of the electronic throttle device 44 (throttle valve 43).

Herein, an exhaust system in the engine according to the present embodiment is described in detail. In the engine according to the present embodiment, as shown in FIGS. 1, 3 and 4, a bypass path 52 communicating from the exhaust path 20 formed on the cylinder head 11 to the exhaust purification catalyst 47 by bypassing the turbo supercharger 45 is provided and an exhaust control valve 53 having a wastegate function capable of opening and closing the bypass path 52 is provided, and a part of the bypass path 52 is provided in the cylinder head 11.

That is to say, as described above, the intake path 19 having the one end communicating with the combustion chamber 16 is formed on the cylinder head 11, and the other end of the intake path 19 opens on one side surface of the cylinder head 11. Also, the exhaust path 20 having the one ends communicating with the combustion chambers 16 is formed on the cylinder head 11, and the other ends of the exhaust path 20 open on the other side surface of the cylinder head 11 as the assembling section 22. On the cylinder head 11, water jackets 54a and 54b are formed so as to be located above and below the intake path 19, on the other hand, water jackets 55a and 55b are formed so as to be located above and below the exhaust path 20. Each of the water jackets 54a, 54b, 55a and 55b is filled with engine cooling water, which can be circulated by a water pump not shown.

The turbo supercharger 45 is composed of the compressor 48 and the turbine 49 integrally connected to each other by the connecting shaft 50, in which the compressor 48 is accommodated in a compressor housing 56, the turbine 49 is accommodated in a turbine housing 57 and the connecting shaft 50 is accommodated in a connecting shaft housing 58, and the housings 56, 57 and 58 are integrally connected to one another. The turbine housing 57 is composed of an inner housing 57a having a scroll section 59 formed therein and an outer housing 57b covering the inner housing 57a and having a cooling path 60 formed therein. In this case, the inner housing 57a is produced by casting, the outer housing 57b is produced by sheet metal processing, and the housings 57a and 57b are integrally adhered to each other.

In the turbine housing 57, an exhaust introducing section 59a of the scroll section 59 adheres closely to the side surface of the cylinder head 11 so as to communicate with the assembling section 22 of the exhaust path 20, and a flange section 57c is fixed to the cylinder head 11 by a plurality of fastening bolts 61. Also, in the turbine housing 57, a cooling water inlet 60a is formed on an upper end thereof and a cooling water outlet 60b is formed on a lower end thereof, and in a state in which this is fixed to the cylinder head 11, the cooling water inlet 60a communicates with the water jacket 55a and the cooling water outlet 60b communicates with the water jacket 55b.

Also, the above-described bypass path 52 is composed of a bypass hole 62 formed in the cylinder head 11 and a bypass tube 63 connecting the cylinder head 11 and the exhaust tube 46, and the exhaust control valve 53 is connected to the bypass tube 63. That is to say, the bypass hole 62 is integrally formed in the cylinder head 11 and in an L-shape in plane view, in which one end thereof communicates with a side portion of the assembling section 22 in the exhaust path 20 and the other end thereof opens on the side surface of the cylinder head 11. In this case, the other end of the bypass hole 62 opens on a side on which the assembling section 22 of the exhaust path 20 opens. That is to say, on the side surface of the cylinder head 11, the opening of the bypass hole 62 and the opening of the assembling section 22 in the exhaust path 20 are formed so as to be aligned in a horizontal direction.

In the exhaust control valve 53, a case 64 has a cylindrical box shape, in which one end thereof adheres closely to the side surface of the cylinder head 11 and the other end thereof adheres closely to one end of the bypass tube 63, and they are fixed by fastening bolts not shown. A base end of an arm 65 is rotatably supported on the case 64 by means of a support shaft 66, and a valve body 67 capable of opening and closing the other end (opening) of the bypass hole 62 is attached thereto. The valve body 67 can adhere closely to a valve sheet (seal member) 68 mounted on the side surface of the cylinder head 11 in the vicinity of the opening of the bypass hole 62 so as to close the opening of the bypass hole 62. Also, an actuator 69 is mounted on the cylinder head 11, and a tip end of a drive rod 69a and the base end of the arm 65 are connected to each other by means of a link 70. Meanwhile, the other end of the bypass tube 63 is connected between the turbo supercharger 45 and the exhaust purification catalyst 47 in the exhaust tube 46.

In this manner, the exhaust control valve 53 is composed of the case 64, the arm 65, the support shaft 66, the valve body 67, the actuator 69 and the link 70, as a unit, and this exhaust control valve unit is provided on the side surface of the cylinder head 11. Therefore, by driving the actuator 69 to move the drive rod 69a in an axial direction, it is possible to rotate the arm 65 about the support shaft 66 through the link 70, and to open and close the bypass hole 62, that is to say, the bypass path 52, by the valve body 67. In this case, the exhaust valve 53 can control a supercharging pressure by the turbo supercharger 45 by opening and closing the bypass path 52, and when the supercharging pressure on an intake side reaches a predetermined pressure, this discharges the exhaust gas to inhibit rotation of the turbine 49 so as to prevent further pressurization by the compressor 48. Also, as described later, the exhaust control valve 53 intend to obtain quick activation by warming up the exhaust purification catalyst 47, by allowing the exhaust gas to directly flow into the exhaust purification catalyst 47 by bypassing the turbine 49, at the time of a cold start of the engine.

Herein, operation of the internal-combustion engine to which the above-described cylinder head 11 is assembled is described. As shown in FIGS. 1 to 4, air introduced to the intake tube 41 through the air cleaner 42 is compressed by the compressor 48 of the turbo supercharger 45. Then, the compressed supercharged intake air is adjusted by the throttle valve 43 and flows into the surge tank 40, passes through each intake path 19 of the cylinder head 11 by means of the intake manifold 39 to reach each intake port 17, and the air in the intake port 17 is inhaled into the combustion chamber 16 when the intake valve 23 is opened. Then, at this intake stroke or at a compression stroke in which the piston 14 rises to compress the intake air, the injector 37 injects a predetermined amount of fuel into the combustion chamber 16. Then, in the combustion chamber 16, high-pressure air and atomized fuel are mixed, and the ignition plug 38 ignites the mixed air to explode the same, so that the piston 14 is depressed and outputs driving force.

Thereafter, when the exhaust valve 24 is opened, the exhaust gas in each combustion chamber 16 flows through the exhaust port 18 to the exhaust path 20, assembled at the assembling section 22 to be discharged from the cylinder head 11. The exhaust gas discharged from the cylinder head 11 drives the turbine 49 of the turbo supercharger 45, and by driving the compressor 48 connected to the turbine 49 by the connecting shaft 50, the air introduced into the intake tube 41 can be compressed. Then, the exhaust gas, which has driven the turbine 49, flows through the exhaust tube 46 into the exhaust purification catalyst 47, and harmful substances in the exhaust gas are herein purified and discharged to atmosphere.

At the time of the cold start of the engine, the exhaust purification catalyst 47 is in a low-temperature state and the temperature does not reach an activation temperature of the exhaust gas, so that it is configured such that consumption of combustion energy of the fuel for driving the engine is reduced by largely delaying the ignition timing and igniting by the ignition plug 38, and the exhaust purification catalyst 47 is rapidly warmed up by the high-temperature exhaust gas. Therefore, at that time, the ECU drives the actuator 69 of the exhaust control valve 53 to open the bypass hole 62 (bypass path 52) by the valve body 67. Then, the high-temperature exhaust gas discharged from the combustion chamber 16 through the exhaust port 18 to the exhaust path 20 flows from the assembling section 22 through the bypass path 52 to the exhaust tube 46, and directly flows into the exhaust purification catalyst 47 by bypassing the turbo supercharger 45. Therefore, it is possible to efficiently warm up the exhaust purification catalyst 47 by the high-pressure exhaust gas to activate the same.

In addition, in the turbo supercharger 45, the engine cooling water flowing through the water jacket 55a of the cylinder head 11 is introduced from the cooling water inlet 60a of the turbine housing 57 to the cooling path 60, flows outside the scroll section 59, and discharged from the cooling water outlet 60b to the water jacket 55b. Therefore, the turbine 49 and the turbine housing 57 heated by the high-temperature exhaust gas are appropriately cooled.

In this manner, in the cylinder head of the internal-combustion engine of the first embodiment, the one ends of the exhaust path 20 communicate with a plurality of combustion chambers 16 through the exhaust ports 18, respectively, the assembling section 22 is provided on the other ends of the exhaust path 20, and the turbo supercharger 45, the exhaust tube 46 and the exhaust purification catalyst 47 are connected to the assembling section 22, on the other hand, the bypass path 52 for communicating from the exhaust path 20 to the exhaust tube 46 and the exhaust purification catalyst 47 by bypassing the turbo supercharger 45 is provided and the exhaust control valve 53, which may open and close the bypass path 52, is provided, and a part of the bypass path 52 is provided in the cylinder head 11.

Therefore, by opening the bypass path 52 by the exhaust control valve 53 at the time of the cold start of the engine, the high-temperature exhaust gas 26 discharged from the combustion chamber 16 through the exhaust port 18 to the exhaust path 20 flows from the assembling section 22 through the bypass path 52 to the exhaust tube 46, and directly flows into the exhaust purification catalyst 47 by bypassing the turbo supercharger 45. Therefore, a path surface area from the combustion chamber 16 to the exhaust purification catalyst 47 is reduced, heat of the high-temperature exhaust gas is not taken away by the turbo supercharger 45 and lowering of the exhaust gas temperature is inhibited, so that it is possible to efficiently warm up the exhaust purification catalyst 47 by the exhaust gas to activate the same, and the catalyst warm-up performance can be improved.

Also, in this case, the bypass hole 62 as a part of the bypass path 52 is formed in the cylinder head 11. Therefore, by forming the bypass hole 62 in the cylinder head 11 in a high-temperature state, it is possible to inhibit the lowering of the exhaust gas temperature, thereby improving catalyst warm-up performance, and by simplifying tube arrangement (bypass tube 63) exposed outside, the device can be made compact.

Also, in the present embodiment, the bypass hole 62 is formed in the cylinder head 11 as the bypass path 52, in which the one end of the bypass hole 62 communicates with the assembling section 22 of the exhaust path 20, and the other end thereof opens on the side surface of the cylinder head 11. Therefore, it is possible to shorten distance from the exhaust path 20 to the exhaust purification catalyst 47 to inhibit the lowering of the exhaust gas temperature, thereby improving the catalyst warm-up performance, and since the exhaust gas is taken out of the assembling section 22, variation in a back pressure among each cylinder disappears and the combustion can be improved.

The bypass hole 62 is formed such that the other end thereof opens on the side portion on which the assembling section 22 of the exhaust path 20 opens, and the turbine housing 57 of the turbo supercharger 45, the exhaust tube 46 and the exhaust purification catalyst 47 can be easily mounted thereon, so that the device can be made simple.

Also, in the present embodiment, the exhaust control valve 53 is provided so as to be able to open and close the opening of the other end of the bypass hole 62. In this case, the exhaust control valve 53 is composed of the case 64, the arm 65, the support shaft 66, the valve body 67, the actuator 69 and the link 70, as the unit, and the exhaust control valve unit is provided on the side surface of the cylinder head 11. Therefore, by providing the exhaust control valve 53 on the cylinder head 11 side, which is maintained in a low-temperature state than the exhaust tube 46, damage by heat can be prevented to improve reliability, and a heat resistant material can be reduced to realize a low cost.

Also, in the present embodiment, the scroll section 59 is provided on the turbine housing 57 of the turbo supercharger 45, and by fixing the turbine housing 57 to the side surface of the cylinder head 11, the scroll section 59 communicates with the assembling section 22 of the exhaust path 20. Therefore, the structure of the turbo supercharger 45 can be made compact and simple and low cost device can be obtained.

Further, in the present embodiment, the cooling path 60 is provided on the turbine housing 57 of the turbo supercharger 45, and the cooling path 60 communicates with the water jackets 55a and 55b provided in the cylinder head 11. Therefore, the engine cooling water flowing through the water jacket 55a of the cylinder head 11 can be introduced into the cooling path 60 of the turbine housing 57 for cooling, and the turbine 49 and the turbine housing 57 heated by the high-temperature exhaust gas are appropriately cooled, so that lowering cost of material can be realized.

In this case, the cooling path 60 is provided on an outer peripheral portion of the turbine housing 57, in which the cooling water inlet 60a communicating with the water jacket 55a is formed on the upper end thereof and the cooling water outlet 60b communicating with the water jacket 55b is formed on the lower end thereof. Therefore, the engine cooling water flowing through the water jacket 55a of the cylinder head 11 is introduced from the cooling water inlet 60a of the turbine housing 57 to the cooling path 60, flows outside the scroll section 59, and is discharged from the cooling water outlet 60b to the water jacket 55b, so that the turbine 49 and the turbine housing 57 heated by the high-temperature exhaust gas can be efficiently cooled.

The turbine housing 57 is composed of the inner housing 57a forming the scroll section 59 and the outer housing 57b covering the inner housing 57a and forming the cooling path 60, and the inner housing 57a is produced by casting and the outer housing 57b is produced by the sheet metal processing, and the housings 57a and 57b are integrally adhered to each other. Therefore, heat resistance and strength can be ensured by the inner housing 57a, and weight saving and low cost can be realized by the outer housing 57b.

Second Embodiment

Figure 5:
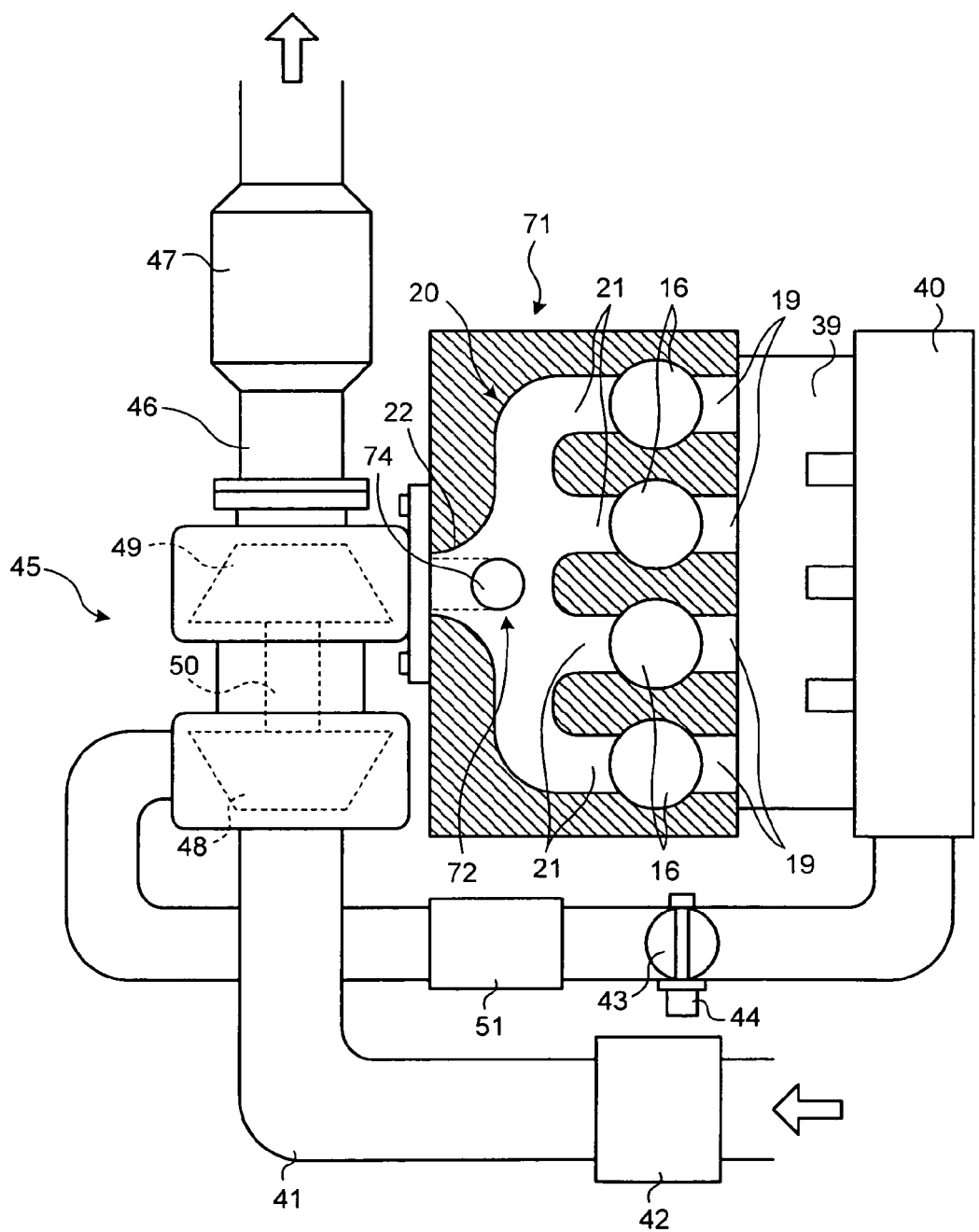
FIG. 5 is a schematic diagram illustrating a cylinder head of an internal-combustion engine according to a second embodiment of the present invention.
Figure 6:
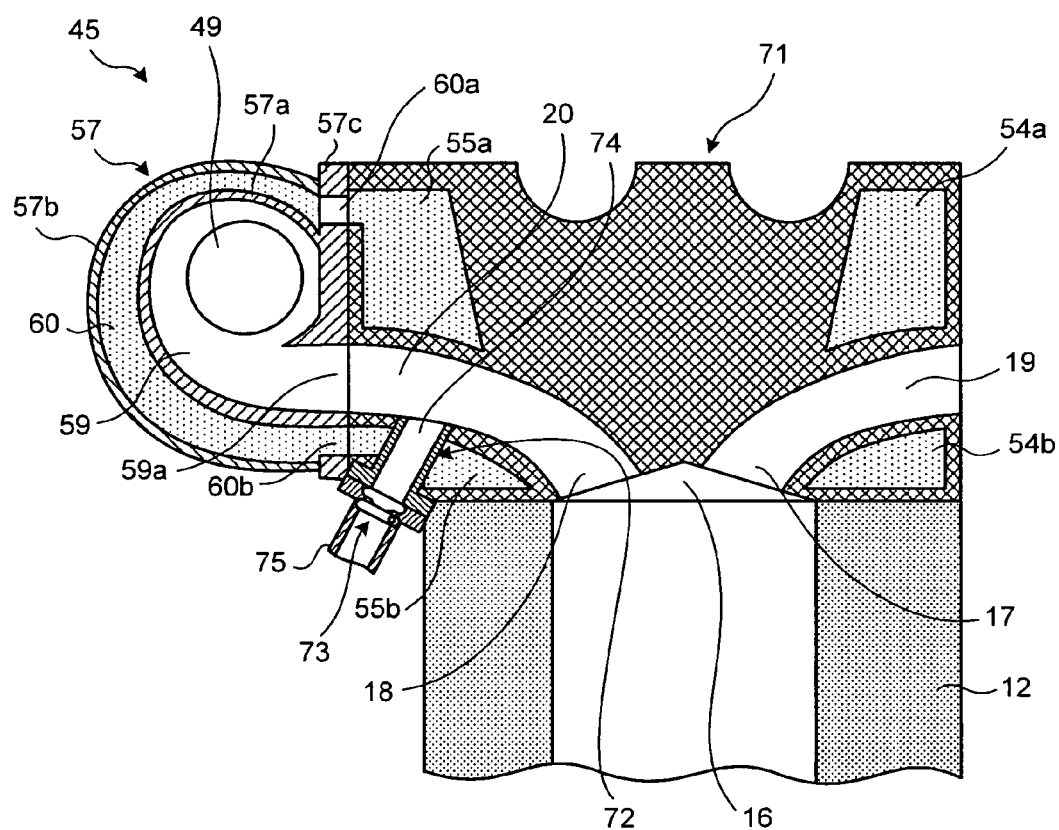
FIG. 6 is a vertical cross-sectional view illustrating the cylinder head of the internal-combustion engine of the second embodiment.

FIG. 5 is a schematic diagram illustrating the cylinder head of the internal-combustion engine according to a second embodiment of the present invention, and FIG. 6 is a vertical cross-sectional view illustrating the cylinder head of the internal-combustion engine of the second embodiment. Meanwhile, the same reference numeral is given to the member having the function similar to that of the member described in the above-described embodiment, and the description thereof is not repeated.

In the internal-combustion engine according to the second embodiment, as shown in FIGS. 5 and 6, the cylinder block 12 is assembled to a lower portion of a cylinder head 71 and is fastened by a plurality of fastening bolts not shown. On the cylinder head 71, a plurality of combustion chambers 16 are formed, in which the intake port 17 and the exhaust port 18 open so as to oppose to each other, the intake path 19 communicates through the intake port 17 and the exhaust path 20 communicates through the exhaust port 18, and the exhaust path 20 has the four exhaust path sections 21 and one assembling section 22, in which the assembling section 22 opens on the other side surface of the cylinder head 71.

The turbo supercharger 45 communicating with the assembling section 22 of the exhaust path 20 is fixed to the side surface of the cylinder head 71, the exhaust tube 46 is connected to the turbo supercharger 45, and the exhaust purification catalyst 47 is mounted on the exhaust tube 46. A bypass path 72 communicating from the exhaust path 20 formed on the cylinder head 71 to the exhaust purification catalyst 47 by bypassing the turbo supercharger 45 is provided and an exhaust control valve 73 having the wastegate function capable of opening and closing the bypass path 72 is provided, and a part of the bypass path 72 is provided in the cylinder head 71.

The bypass path 72 is composed of a bypass hole 74 formed in the cylinder head 11 and a bypass tube 75 connecting the cylinder head 71 and the exhaust tube 46, and the exhaust control valve 73 is connected on a cylinder head 71 side. That is to say, the bypass hole 74 is integrally formed in the cylinder head 71 so as to incline, in which an upper end thereof communicates with a lower portion of the assembling section 22 in the exhaust path 20, and a lower end thereof opens on the side surface of the cylinder head 71. In this case, the lower end of the bypass hole 74 opens below a lower portion on which the assembling section 22 of the exhaust path 20 opens. That is to say, on the side surface of the cylinder head 71, the opening of the bypass hole 74 and the opening of the assembling section 22 in the exhaust path 20 are formed so as to be aligned in a vertical direction.

The exhaust control valve 73 is mounted on the opening of the bypass hole 74 of the cylinder head 71, and the bypass tube 75 is connected thereto. Meanwhile, although not shown, the other end of the bypass tube 75 is connected between the turbo supercharger 45 and the exhaust purification catalyst 47 in the exhaust tube 46.

Meanwhile, the operation of the engine according to the present embodiment is substantially similar to that of the above-described first embodiment, so that the description thereof is omitted.

In this manner, in the cylinder head of the internal-combustion engine of the second embodiment, one ends of the exhaust path 20 communicate with a plurality of combustion chambers 16 through the exhaust ports 18, respectively, the assembling section 22 is provided on the other ends of the exhaust path 20, and the turbo supercharger 45, the exhaust tube 46 and the exhaust purification catalyst 47 are connected to the assembling section 22, on the other hand, the bypass path 72 communicating from the exhaust path 20 to the exhaust tube 46 and the exhaust purification catalyst 47 by bypassing the turbo supercharger 45 is provided, and the exhaust control valve 73 capable of opening and closing the bypass path 72 is provided, and the bypass hole 74 as a part of the bypass path 72 is formed in the cylinder head 71.

Therefore, by opening the bypass path 72 by the exhaust control valve 73 at the time of the cold start of the engine, the high-temperature exhaust gas discharged from the combustion chamber 16 through the exhaust port 18 to the exhaust path 20 flows from the assembling section 22 through the bypass path 72 to the exhaust tube 46, and directly flows into the exhaust purification catalyst 47 by bypassing the turbo supercharger 45. Therefore, the path surface area from the combustion chamber 16 to the exhaust purification catalyst 47 is reduced, the heat of the high-temperature exhaust gas is not taken away by the turbo supercharger 45 and the lowering of the exhaust gas temperature is inhibited, so that it is possible to efficiently warm up the exhaust purification catalyst 47 by the exhaust gas to activate the same, and the catalyst warm-up performance can be improved.

Also, in this case, the bypass hole 74 as a part of the bypass path 72 is formed in the cylinder head 71. Therefore, by forming the bypass hole 74 in the cylinder head 11 in the high-temperature state, it is possible to inhibit the lowering of the exhaust gas temperature to improve the catalyst warm-up performance, and by simplifying the tube arrangement (bypass tube 75) exposed to the outside, the device can be made compact.

Also, as the bypass path 72, the bypass hole 74 is formed in the cylinder head 71, and the one end of the bypass hole 74 communicates with the assembling section 22 of the exhaust path 20 and the other end thereof opens on the side surface of the cylinder head 11. Therefore, it is possible to shorten the distance from the exhaust path 20 to the exhaust purification catalyst 47 to inhibit the lowering of the exhaust gas temperature, thereby improving the catalyst warm-up performance, and since the exhaust gas is taken out of the assembling section 22, the variation in the back pressure among each cylinder disappears and the combustion can be improved.

Third Embodiment

Figure 7:
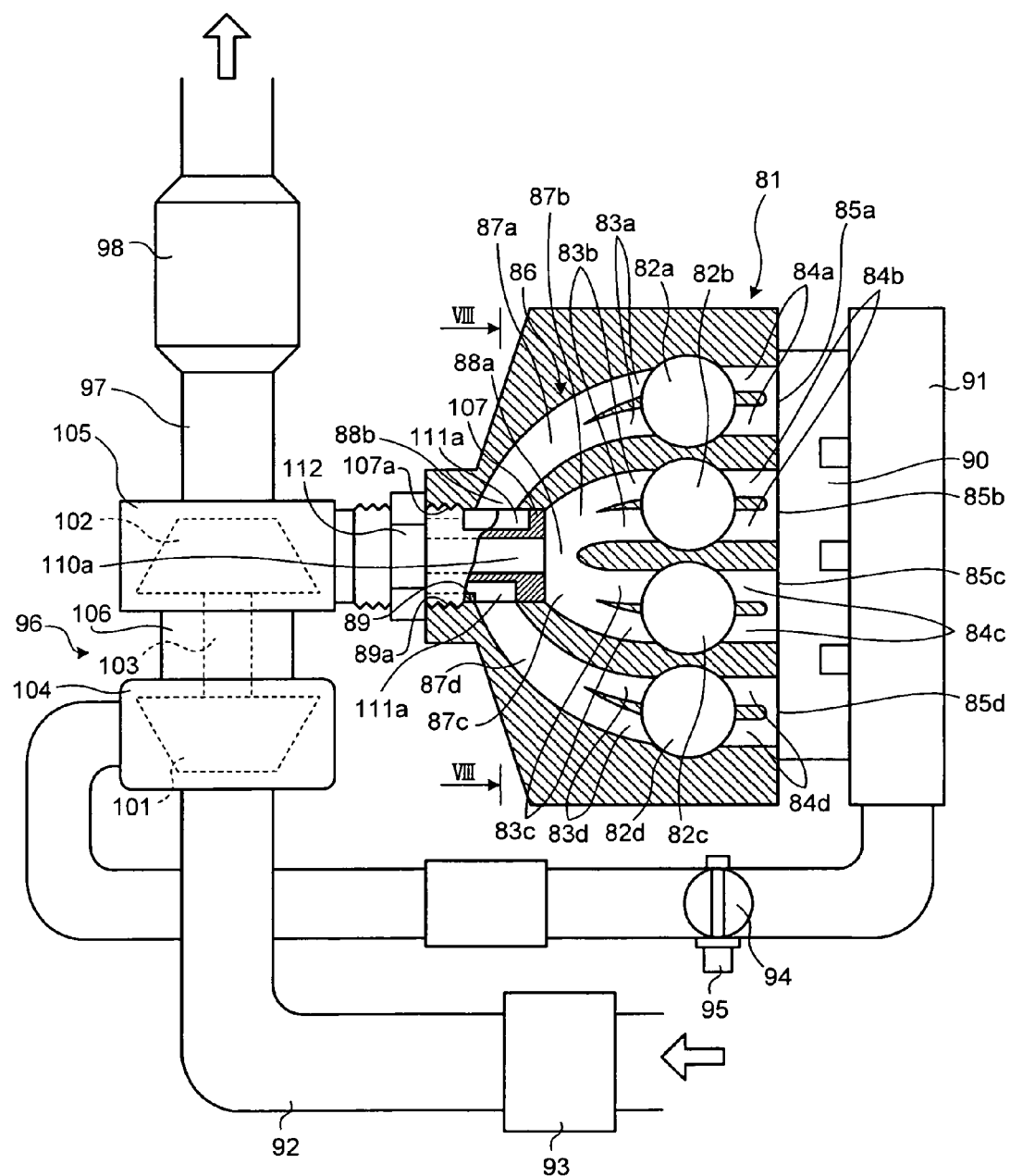
FIG. 7 is a schematic diagram illustrating a cylinder head of an internal-combustion engine according to a third embodiment of the present invention.
Figure 8:
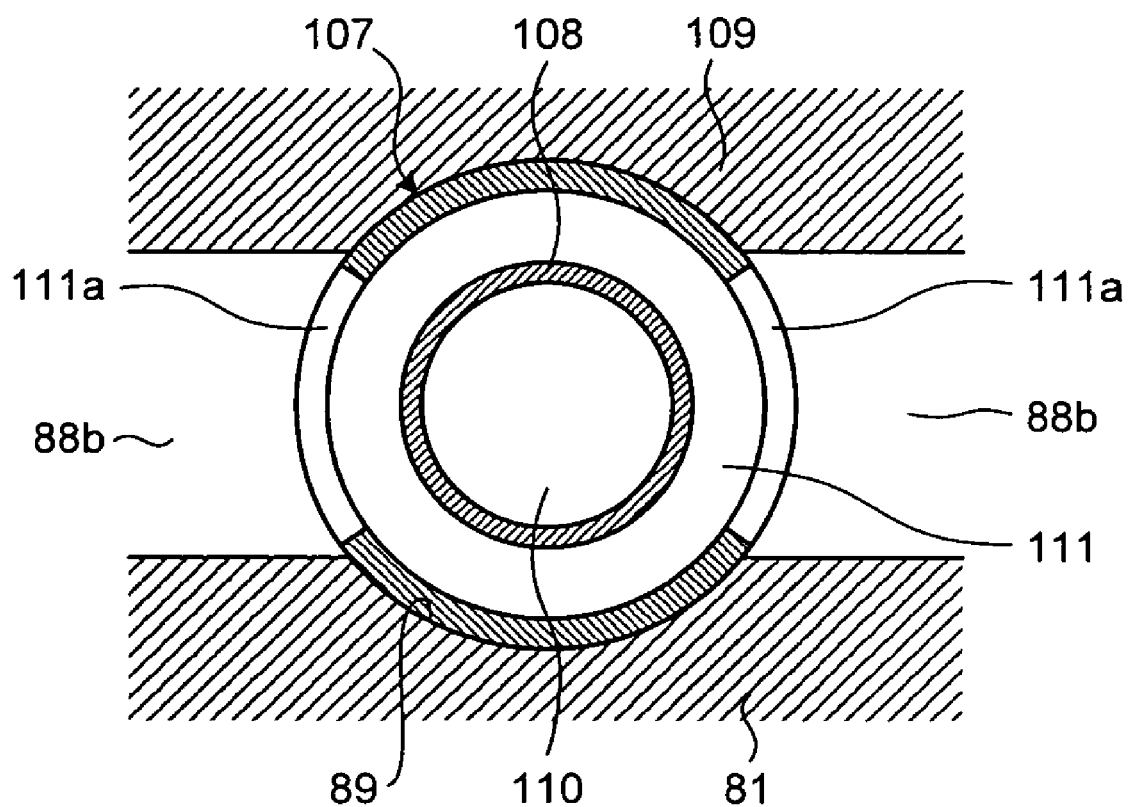
FIG. 8 is a substantial part vertical cross-sectional view (cross-sectional view taken along line VIII-VIII of FIG. 7) illustrating the cylinder head of the internal-combustion engine of the third embodiment.

FIG. 7 is a schematic diagram illustrating the cylinder head of the internal-combustion engine according to a third embodiment of the present invention, and FIG. 8 is a substantial part vertical cross-sectional view (cross-sectional view taken along line VIII-VIII of FIG. 7) illustrating the cylinder head of the internal-combustion engine of the third embodiment. Meanwhile, the same reference numeral is given to the member having the function similar to that of the member described in the above-described embodiment, and the description thereof is not repeated.

In the internal-combustion engine according to the third embodiment, as shown in FIGS. 7 and 8, a plurality of combustion chambers 82a, 82b, 82c and 82d are formed on a cylinder head 81, in which intake ports 83a, 83b, 83c and 83d and exhaust ports 84a, 84b, 84c and 84d open so as to oppose to each other, respectively, four intake paths 85a, 85b, 85c and 85d communicate through the intake ports 83a, 83b, 83c and 83d and one exhaust path 86 communicates through the exhaust ports 84a, 84b, 84c and 84d, and the exhaust path 86 has four exhaust path sections 87a, 87b, 87c and 87d and two assembling sections 88a and 88b, and the assembling sections 88a and 88b communicate with a connecting hole 89 opening on the other side surface of the cylinder head 81.

An intake manifold 90 communicating with each of the intake paths 85a, 85b, 85c and 85d is fixed to one side surface of the cylinder head 81, and a surge tank 91 is connected to the intake manifold 90. An intake tube 92 has an air cleaner 93 attached to an air inlet on an upstream side thereof, and a downstream side end connected to the surge tank 91, and is provided with an electronic throttle device 95 having a throttle valve 94 located on a downstream side of the air cleaner 93. On the other hand, a turbo supercharger 96 communicating with the assembling sections 88a and 88b of the exhaust path 86 is fixed to the connecting hole 89 on the other side surface of the cylinder head 81, the exhaust tube 97 is connected to the turbo supercharger 96, and the exhaust purification catalyst 98 is mounted on the exhaust tube 97. In addition, although not shown, a bypass path communicating from the exhaust path 86 formed on the cylinder head 81 to the exhaust purification catalyst 98 by bypassing the turbo supercharger 96, and an exhaust control valve are provided.

Also, the turbo supercharger 96 is a twin-entry type turbo supercharger, and is formed of a compressor 101 and a turbine 102 integrally connected by a connecting shaft 103, in which the compressor 101 is accommodated in a compressor housing 104, the turbine 102 is accommodated in a turbine housing 105, and the connecting shaft 103 is accommodated in a connecting shaft housing 106, and the housings 104, 105 and 106 are integrally connected to one another. The turbine housing 105 has two scroll sections not shown formed therein.

Also, a connecting section 107, which can fit the connecting hole 89 of the cylinder head 81, is connected to the turbine housing 105 of the turbo supercharger 96. The connecting section 107 is composed of an inner cylinder 108 and an outer cylinder 109, and two exhaust guiding sections 110 and 111 are formed. The exhaust guiding sections 110 and 111 are configured such that one ends thereof communicate with each scroll section in the turbine housing 105, on the other hand, an opening 110a is formed on the other end of the exhaust guiding section 110 and the other end of the exhaust guiding section 111 changes speed and openings 111a are formed on right and left sides thereof. Also, an internal thread 89a is formed on an entry of the connecting hole 89 of the cylinder head 81, an external thread 107a, which can be threadably mounted on the internal thread 89a, is formed on a base end side of the connecting section 107, and a rock nut 112 is threadably mounted on the external thread 107a.

Therefore, by fastening the rock nut 112 after fitting the connecting section 107 of the turbine housing 105 to the connecting hole 89 of the cylinder head 81 to threadably mount the external thread 107a on the internal thread 89a, the turbine housing 105 is fixed to the cylinder head 81. Then, in such a state, the exhaust guiding sections 110 and 111 of the turbine housing 105 are arranged in the assembling sections 88a and 88b in an exhaust path 86 of the cylinder head 71. Then, the combustion chambers 82b and 82c communicate with the exhaust guiding section 110 through the exhaust path sections 87b and 87c and the assembling section 88a, and the combustion chambers 82a and 82d communicate with the exhaust guiding section 111 through the exhaust path sections 87a and 87d and the assembling section 88b.

Therefore, the exhaust gas in each of the combustion chambers 82b and 82c is introduced into the exhaust guiding section 110 through the exhaust path sections 87b and 87c and the assembling section 88a, and flows through the exhaust guiding section 110 into one scroll section in the turbo supercharger 96, and the exhaust gas in each of the combustion chambers 82a and 82d is introduced into the exhaust guiding section 111 through the exhaust path sections 87a and 87d and the assembling section 88b, and flows through the exhaust guiding section 111 into the other scroll section in the turbo supercharger 96. Therefore, by driving the turbine 102 by the exhaust gas flowing into each scroll sections to drive the compressor 101 connected to the turbine 102 by the connecting shaft 103, the air introduced into the intake tube 92 can be compressed. Then, the exhaust gas, which has driven the turbine 102, flows into the exhaust purification catalyst 98 through the exhaust tube 97, and herein, the harmful substances in the exhaust gas are purified and are discharged to atmosphere.

Meanwhile, since the operation of the engine according to the present embodiment is substantially similar to that of the above-described first embodiment, the description thereof is omitted.

In this manner, in the cylinder head of the internal-combustion engine according to the third embodiment, one ends of the exhaust path 86 communicate with a plurality of combustion chambers 82a, 82b, 82c and 82d through the exhaust ports 84a, 84b, 84c and 84d, respectively, the assembling sections 88a and 88b are provided on the other ends of the exhaust path 86, the turbo supercharger 96, the exhaust tube 97 and the exhaust purification catalyst 98 are connected to the assembling sections 88a and 88b, the exhaust guiding sections 110 and 111 having one ends opening to the outside are provided on the connecting section 107 of the turbine housing 105, and the exhaust guiding sections 110 and 111 are arranged in the assembling sections 88a and 88b of the exhaust path 86.

Therefore, by fitting the connecting section 107 of the turbine housing 105 to the connecting hole 89 of the cylinder head 81 to fix, it is possible to mount the turbine housing 105 on the cylinder head 81, thereby improving assembling performance of the turbo supercharger 96. Also, since the exhaust guiding sections 110 and 111 are arranged in the cylinder head 81, it is possible to reduce the size of the turbo supercharger 96 itself, and the path surface area from the combustion chambers 82a, 82b, 82c and 82d to the exhaust purification catalyst 98 is reduced, the heat of the high-temperature exhaust gas is not taken away by the turbo supercharger 96 and the lowering of the exhaust gas temperature is inhibited, so that it is possible to efficiently warm up the exhaust purification catalyst 98 by the exhaust gas to activate the same, thereby improving the catalyst warm-up performance.

Meanwhile, although the internal-combustion engine is described as the in-line four-cylinder engine in the above-described embodiments, the engine is not limited to this type. Also, although the internal-combustion engine is described as an in-cylinder injection type in which the fuel is directly injected into the combustion chamber in the above-described embodiment, the effect similar to that described above can be obtained by applying the invention to a port-injection type internal-combustion engine in which the fuel is injected into the intake port.

INDUSTRIAL APPLICABILITY

As described above, the cylinder head of the internal-combustion engine according to the present invention is to improve the catalyst warm-up performance and realize the compact device by providing a part of the bypass path for bypassing the supercharger therein, and is preferably used in every type of the internal-combustion engine.

The invention claimed is:

1. A cylinder head of an internal-combustion engine comprising:
   a plurality of combustion chambers;
   a plurality of intake paths communicating with each of the combustion chambers through intake ports, respectively;
   an exhaust path having one ends communicating with each of the combustion chambers through exhaust ports, respectively, and an assembling section at which the other ends are assembled;
   a supercharger connected to the assembling section of the exhaust path;
   an exhaust purification catalyst connected to the assembling section of the exhaust path;
   a bypass path communicating from the exhaust path to the exhaust purification catalyst by bypassing the supercharger, and
   a control valve capable of opening and closing the bypass path,
   wherein a part of the bypass path is provided in the cylinder head of the internal-combustion engine,
   wherein a bypass hole having one end communicating with the assembling section of the exhaust path and the other end opening on a side surface of the cylinder head is formed as the bypass path,
   wherein the other end of the bypass hole is formed so as to open on a side portion on which the assembling section of the exhaust path opens, and
   wherein the control valve is composed of a valve body capable of opening and closing the other end of the bypass hole, an actuator, and a link connecting the actuator and the valve body, as a unit, and the control valve unit is provided on the side surface of the cylinder head.

2. A cylinder head of an internal-combustion engine comprising:
   a plurality of combustion chambers;
   a plurality of intake paths communicating with each of the combustion chambers through intake ports, respectively;
   an exhaust path having one ends communicating with each of the combustion chambers through exhaust ports, respectively, and an assembling section at which the other ends are assembled;
   a supercharger connected to the assembling section of the exhaust path,
   wherein a turbine housing of the supercharger has an exhaust guiding section having one end opening to outside and a scroll section with which the other end of the exhaust guiding section communicates, and the exhaust guiding section is arranged in the assembling section of the exhaust path;
   an exhaust purification catalyst connected to the assembling section of the exhaust path;
   a bypass path communicating from the exhaust path to the exhaust purification catalyst by bypassing the supercharger, and
   a control valve capable of opening and closing the bypass path,
   wherein a part of the bypass path is provided in the cylinder head of the internal-combustion engine.

3. A cylinder head of an internal-combustion engine comprising:
   a plurality of combustion chambers;
   a plurality of intake paths communicating with each of the combustion chambers through intake ports, respectively;

an exhaust path having one ends communicating with each of the combustion chambers through exhaust ports, respectively, and an assembling section at which the other ends are assembled;

a supercharger connected to the assembling section of the exhaust path, wherein a cooling path is provided on a turbine housing of the supercharger, and the cooling path communicates with a water jacket provided in the cylinder head, and wherein the cooling path is provided on an outer peripheral portion of the turbine housing, a cooling water inlet communicating with the water jacket is formed on an upper end of the turbine housing, and a cooling water outlet communicating with the water jacket is formed on a lower end of the turbine housing;

an exhaust purification catalyst connected to the assembling section of the exhaust path;

a bypass path communicating from the exhaust path to the exhaust purification catalyst by bypassing the supercharger, and a control valve capable of opening and closing the bypass path, wherein a part of the bypass path is provided in the cylinder head of the internal-combustion engine.

* * * * *